3,070,469
METHOD OF ENCAPSULATION OF LITHIUM BOROHYDRIDE
William C. Jenkin, Dayton, Ohio, assignor to The Commonwealth Engineering Company of Ohio, Dayton, Ohio, a corporation of Ohio
No Drawing. Filed Dec. 23, 1959, Ser. No. 861,423
2 Claims. (Cl. 149—5)

My invention relates to a method for the production of encapsulated articles and more particularly to a method for the encapsulation of active materials by gas plating.

Many materials widely in use in commerce and in particular, materials used in particulate form are subject to the action of various materials such as oxygen, moisture and so forth, to such an extent that the use and storage of such materials present numerous difficulties, and in many instances cannot even be used without special precautions being taken at the time of manufacture so that the materials can be satisfactorily handled and stored. Such materials I refer to herein as "active materials."

Highly hydroscopic materials such as anhydrous aluminum chloride deteriorate immediately on exposure to air. They may be handled in moisture proof bags or cans in storage or shipment, but on removal from these containers for use in some process, special steps are needed, such as handling under an inert atmosphere. By encapsulating this material with a thin film of metal, by pyrolytic decomposition of a volatilizable nickel compound, for example, it can be handled in the open air and charged into a vessel or mixture. The encapsulating film is then removed by dissolving, by reacting one of the materials in the vessel, by crushing in the vessel in the presence of other reactants, by heating to rupture the encapsulating film, or in the case of molten metals, by the melting or solution of the metal film in the molten mold.

Other types of active materials are seriously affected by the action of oxygen or other gaseous materials with which they may come in contact, with the result that their handling and storage over an extended period of time presents numerous difficulties. This is particularly the case with various solid rocket fuels used in particulate form. Some materials of this type, such as for example, lithium borohydride are affected to such a degree by oxygen that their use as rocket fuels is impractical since they cannot be satisfactorily stored for extended periods of time without serious deterioration or other hazards. This fact has made it impractical to use important rocket fuels such as lithium borohydride even tho it has a high heat of combustion of approximately 35,000 B.t.u. per pound as compared to, for example, pentaborane, a currently favored rocket fuel, which has a heat of combustion of only 29,000 B.t.u. per pound. The importance of a suitable practical method of protecting such active materials from the effects of moisture, oxygen, and so forth, is therefore clearly evident. A suitable coating for such materials might be aluminum, deposited by pyrolytic decomposition of a vaporizable compound such as an alkyl aluminum. Moreover, this coating in itself will contribute to the heat of combustion of the fuel. The object of my invention is the provision of a method of providing suitable protection to active materials of various types by gas plating the active materials with thin coatings of various types of metals.

Active materials in particulate form can be suitably encapsulated by gas plating in a number of ways. For example, the particles can be agitated in the presence of an atmosphere of a heat-decomposable metal compound while heated to the temperature at which the said heat-decomposable metal compound decomposes into metal. Agitation can be suitably effected by tumbling or rolling the particles in a drum while maintaining in the drum an atmosphere of the heat-decomposable metal compound. Another modification of the same general type procedure consists of forcing the heat-decomposable metal compound through a static bed of the particles, or a bed of the heated particles, which is permitted to be agitated by the flow of the heat-decomposable metal compounds forced through the bed. By another modification the heated particles of active material are circulated through an atmosphere of the heat-decomposable metal compounds. This is accomplished either by dropping or blowing the particles through such an atmosphere. In either case if a metal coating of sufficient thickness is not obtained by a single passage through the gas the partially coated particles can be collected and repassed through the atmosphere of heat-decomposable metal compounds until a coating of metal of the desired thickness is obtained.

One of the features of encapsulating by this process is the ability to uniformly coat aggregates on all sides simultaneously and thereby guarantee complete encapsulation not attainable by other methods. Comparison with other methods of depositing a film of metal will illustrate this advantage. For example, when coating by evaporation of metals under a high vacuum, the evaporated metal travels on a "line of sight," such as a ray of light, so that an aggregate is coated only on the side exposed to the source of hot, evaporating metal. Each individual aggregate has to be exposed many times in a random fashion to this source, with no guarantee that every part of its surface gets coated. Aggregates can be coated with molten metals. If the metal wets the solid, the coat will cover it, but the coat is never uniform, tending to run to one side, as a drop of water off a small rod. Moreover, reactive materials given as examples above could not be subjected to the action of most molten metals, such as aluminum or nickel.

Another method of encapsulation is by electro-less plating. Another is by "silvering" as with a mirror. These methods currently employ water solutions and are obviously unsuitable for use with "active" materials readily attacked by atmosphere.

Metals which I can use for the encapsulation of active materials include any of the compounds of metal which can be decomposed into the corresponding metals at a temperature not in excess of that which would have a deleterious effect on the active materials being encapsulated. Suitable metals include: aluminum, antimony, boron, beryllium, chromium, cobalt, copper, iron, magnesium, molybdenum, nickel, osmium, rhenium, ruthenium, tellurium, lead, platinum, tin, tungsten, titanium, zirconium, cadmium, hafnium, thorium, scandium, gallium, indium, as well as others.

The heat-decomposable metal compound can be of various types and the particular form selected will depend upon such factors as the effect of the particular heat-decomposable metal compound and the metal produced therefrom, upon the active material being encapsulated, as well as the cost of the material, the particular effect and degree of protection desired and other factors. Compounds which can be used include: the metal acetylacetonates, metal alkyls, metal aryls, metal halides, metal carbonyls, metal carbonyl halogens, metal hydrides, metal nitroxyl compounds and metal nitrosyl carbonyls. Specific examples of such heat-decomposable metal compounds include: copper acetylacetonate, nickel carbonyl, chromium hexacarbonyl and the like.

The thickness of the metal film with which the active material is encapsulated is dependent upon a number of factors, such as, the particular metal or metal compound employed for the encapsulation, the number of times and the length of time the particles of active material are subjected to the action of the heat-decomposable compound, the concentration of the latter, etc. The time of contact of the particles with the heat-decomposable metal compound can be suitably regulated by dropping the particles through columns of different heights or by blowing the particles through an atmosphere of heat-decomposable compounds at different rates or by the number of times the particles are passed through the encapsulating zone.

One suitable method of regulating the thickness of the encapsulating film is by mixing the vapors of the heat-decomposable compounds with varying amounts of an inert gaseous carrier such as carbon dioxide, carbon monoxide, hydrogen, helium, argon, neon, nitrogen, the gaseous products resulting from the controlled burning of hydrocarbons in the absence of oxygen, and the like. By use of such inert carriers any desired concentration of the heat-decomposable metal compounds can be obtained. Obviously, however, the particular carrier gas selected must be inert to the material being encapsulated under the conditions of the encapsulating operation.

The temperature employed for my encapsulating operation is primarily dependent upon the temperature at which the heat-decomposable compound decomposes into metal. The temperature employed, therefore, will depend upon this factor as well as the effect of elevated temperatures on the material being encapsulated.

Within the limitations set forth above I can use in my encapsulating process any of the procedures and conditions well known to the gas plating art. It is understood, therefore, that I am not limited to the specific conditions set forth in the examples below but include within the scope of my invention any of the equivalents thereof well known to the art.

Example I

Crystals of lithium borohydride preheated to a temperature of 350° F. were dropped from the head of a fifty-foot column and permitted to fall through an uprising column of nickel carbonyl in vapor form diluted with argon gas traveling at a rate of two lineal feet per minute, the ratio of nickel carbonyl to argon being 1:20. The particles of lithium borohydride at the bottom of the tower were found to be coated with a film of metallic nickel and could be stored for extended periods of time, without deterioration to such a degree as to make the lithium borohydride unsuitable for use as a rocket fuel.

Example II

Lithium borohydride crystals were coated with aluminum by the use of aluminum triisobutyl using the same general procedure described in Example I. The treated crystals were coated with a thin coating of metallic aluminum. In this case argon was used as the inert diluent gas and the temperature was maintained at approximately 450° F.

Example III

Crystals of lithium borohydride were blown through a tube with a current of nickel carbonyl vapors diluted with carbon dioxide. The temperature of the mixture was maintained at 350° F. by the aid of infra-red rays introduced into the tube through windows placed at spaced intervals throughout the length of the tube. Crystals of lithium borohydride coated with a thin film of protective nickel were separated from the gases and found to remain effective as a rocket fuel after extended periods of storage.

Example IV

Anhydrous aluminum chloride in particulate form was coated with a thin film of aluminum in the manner described in Example II. The resulting coated particles were found to be uniformly coated with metallic aluminum and could be stored for extended periods of time without losing their anhydrous elements.

Other hydroscopic materials or materials readily affected by contact with oxygen or other gases can be satisfactorily protected in accordance with any of the procedures described above.

Now having described my invention, what I claim is:

1. An improved method of handling and storing hydroscopic lithium borohydride which process comprises flowing lithium borohydride in particulate form through an atmosphere of a heat-decomposable metal compound, said contact being effected at a temperature above that at which said heat-decomposable metal compound decomposes into metal, and maintaining contact between said lithium borohydride and said heat-decomposable metal compound until a protective coating of metal is formed on said particulates of lithium borohydride.

2. Particulates of hydroscopic crystalline borohydride of lithium protected during handling and storing from the deleterious effect of contact with the atmosphere by a thin coating of metal deposited by gas plating.

References Cited in the file of this patent

UNITED STATES PATENTS

| | | |
|---|---|---|
| 2,599,978 | Davis et al. | June 10, 1952 |
| 2,839,423 | Homer et al. | June 17, 1958 |